(12) United States Patent
De Almeida Ferreira et al.

(10) Patent No.: US 11,506,548 B2
(45) Date of Patent: Nov. 22, 2022

(54) INTERROGATOR FOR TWO FIBER BRAGG GRATING MEASUREMENT POINTS

(71) Applicant: Hottinger Baldwin Messtechnik GmbH, Darmstadt (DE)

(72) Inventors: Luis Alberto De Almeida Ferreira, Vila Nova de Gala (PT); Francisco Manuel Moita Araljjo, Matosinhos (PT); Jochen Maul, Mainz (DE)

(73) Assignee: HOTTINGEER BRÜEL & KJAER GMBH, Darmstadt (DE)

( * ) Notice: Subject to any disclaimer, the term of this patent is extended or adjusted under 35 U.S.C. 154(b) by 0 days.

(21) Appl. No.: 16/954,928

(22) PCT Filed: Dec. 18, 2018

(86) PCT No.: PCT/DE2018/000377
§ 371 (c)(1),
(2) Date: Oct. 27, 2020

(87) PCT Pub. No.: WO2019/120356
PCT Pub. Date: Jun. 27, 2019

(65) Prior Publication Data
US 2021/0055172 A1    Feb. 25, 2021

(30) Foreign Application Priority Data
Dec. 18, 2017 (DE) ..................... 10 2017 011 730.6

(51) Int. Cl.
*G01L 1/24* (2006.01)
(52) U.S. Cl.
CPC ................... *G01L 1/246* (2013.01)

(58) Field of Classification Search
CPC ............................ G01L 1/246; G01D 5/35316
USPC ......................................................... 73/862.624
See application file for complete search history.

(56) References Cited

U.S. PATENT DOCUMENTS

| 5,869,835 A | 2/1999 | Udd |
| 6,606,158 B2 * | 8/2003 | Rosenfeldt ............... G01J 4/04 356/477 |
| 6,788,419 B2 * | 9/2004 | Cierullies ........... G01M 11/331 356/477 |

(Continued)

FOREIGN PATENT DOCUMENTS

| CN | 101419317 A | 4/2009 |
| CN | 101680781 A | 3/2010 |

(Continued)

OTHER PUBLICATIONS

Translation of Chinese Search Report dated Sep. 22, 2021 with respect to counterpart Chinese patent application 201880089693.2.

*Primary Examiner* — Octavia Davis Hollington
(74) *Attorney, Agent, or Firm* — Henry M. Feiereisen LLC

(57) ABSTRACT

A measuring arrangement for fiber Bragg grating measurement points and particularly a measuring arrangement for two fiber Bragg gratings (FBG), wherein a first measurement point is subjected to tension and a second measurement point is subjected to pressure, or vice versa. The circuit arrangement includes a broadband light source, a first beam splitter, a second beam splitter, a third beam splitter, a fourth beam splitter, a fifth beam splitter, photodiodes and an optical delay element.

2 Claims, 2 Drawing Sheets

(56) References Cited

U.S. PATENT DOCUMENTS

| | | | |
|---|---|---|---|
| 7,038,190 B2 * | 5/2006 | Udd | G01D 5/35383 250/227.11 |
| 9,383,272 B2 * | 7/2016 | Buck | G01D 5/35316 |
| 2004/0052444 A1 | 3/2004 | Moslehi et al. | |
| 2004/0113055 A1 | 6/2004 | Whelan et al. | |
| 2009/0092352 A1 | 4/2009 | Ng et al. | |
| 2021/0254967 A1 * | 8/2021 | Froggatt | G01B 9/02049 |

FOREIGN PATENT DOCUMENTS

| | | | |
|---|---|---|---|
| CN | 102519501 A | 6/2012 | |
| CN | 203772289 U | 8/2014 | |
| CN | 105910546 A | 8/2016 | |
| CN | 106153225 A | 11/2016 | |
| DE | 4308553 A1 * | 9/1994 | G02B 6/272 |
| DE | 19821616 A1 | 11/1999 | |
| DE | 102009013795 A1 | 9/2010 | |
| KR | 20120107242 | 10/2012 | |
| TW | 200722735 A | 6/2007 | |

* cited by examiner

INTERROGATOR FOR TWO FIBER BRAGG GRATING MEASUREMENT POINTS

CROSS-REFERENCES TO RELATED APPLICATIONS

This application is the U.S. National Stage of International Application No. PCT/DE2018/000377, filed Dec. 18, 2018, which designated the United States and has been published as International Publication No. WO 2019/120356 A1 and which claims the priority of German Patent Application, Serial No. 10 2017 011 730.06, filed Dec. 18, 2017, pursuant to 35 U.S.C. 119(a)-(d).

BACKGROUND OF THE INVENTION

The Invention relates to a measuring arrangement for fiber Bragg grating measuring points and in particular to a measuring arrangement for two fiber Bragg gratings (FBG), with the first measuring point being subjected to tension and the second measuring point to pressure, or vice versa. Furthermore, the measuring arrangement should be inexpensive to manufacture and long-term stable.

Fiber Bragg grating sensors involve robust fiber optic measurement probes that are used in particular for high-resolution detection of strains. The measuring principle of such fiber Bragg grating sensors is based on the fact that a so-called fiber Bragg grating (FBG) is introduced in the direction of transmission of an optical waveguide for periodically changing the refractive index. This fiber Bragg grating acts like a frequency-selective filter, with the grating constants thereof being selected such that a very narrow-band intensity maximum is reflected as a peak when broadband radiating light is involved. The spatial spacing within the periodic sequence of the zones with different refractive index is decisive for the position (primary Bragg wavelength) of the intensity maximum. This is utilized for the use of measuring points with such fiber Bragg grating sensors preferably for the detection of strains. The position of the intensity maximum shifts, when a light guide is strained in the area of the periodic change of the refractive index. This shift in wavelength is a measure of the strain.

Various devices and methods are known from the prior art to measure the wavelengths or wavelength changes of the reflected intensity maxima and to determine the strain values therefrom.

With the so-called edge filter measuring method, the reflected light is guided across an optical filter, with the light transmission thereof changing with the wavelength. As a reflection peak changes its wavelength, the light intensity changes behind the edge filter, which can be measured using photodiodes. This method is simple, but has the disadvantages that it is only capable of evaluating a single fiber Bragg grating, but cannot illustrate a spectrum, and it shows substantial errors when exposed to scattered light.

In the so-called CCD charge-coupled device measuring method, the reflected intensity maximum is spectrally expanded and then projected onto a CCD line. The CCD line is read out and the wavelength of the reflection peaks is determined by association to the pixels of the CCD. This method can measure many fiber Bragg gratings on a fiber or waveguide but can also only illustrate the spectrum from only one fiber. Another limitation is that this method can only be operated with silicon CCDs at a reasonable cost. This means a restriction to the wavelength range around 800 nm. The inexpensive components from the telecommunications sector are therefore also not usable for this application, since these preferably operate in the wavelength range around 1550 nm.

Moreover, a measuring method with a tunable laser is known for detecting the respective wavelength or wavelength changes on fiber Bragg gratings. This measuring method does not use a broadband laser diode to generate light, but a laser that emits its entire radiation energy in a very small bandwidth of <0.005 nm. The wavelength of the laser is changed linearly over a measuring range of, for example, 1500 nm to 1600 nm and back again from 1600 nm to 1500 nm in the form of a triangular function. There are strong reflections at the respective peak wavelengths of the fiber Bragg gratings. The entire reflected spectrum of a fiber or a waveguide can be determined with a photodiode, which measures the radiation energy currently being reflected back during the tuning of the laser. As a result of the available high spectral energy of the laser, which energy concentrates on the very small bandwidth, very large measurement-to-noise ratios can be achieved that allow the energy of the laser to be distributed over many waveguides or fibers, so that the number of measuring points that can be connected overall can be very high. The measuring accuracy of this method is hereby also very high. When using many measuring points with fiber Bragg gratings, this measuring method has the disadvantage that a relatively wide wavelength range has to be scanned one after the other, which can lead to wavelength changes during the scanning time period, particularly in the case of dynamic measurements with a temporally variable strain curve. This results in time-dependent deviations, which can result in errors when comparing the measurement results.

From the article by S. H. Yun, D. J. Richardson and B. Y. Kim Interrogation of fiber grating sensor arrays with a wavelength-swept fiber laser, Optics Letters, vol. 23, p. 843-845, 1998, it is known to generate a repetition frequency of wavelengths of a light beam linearly ascending in the form of a measuring ramp. In particular, a repetition frequency of the wavelength variations of 250 Hz is mentioned, which describes only one advantageous aspect in fiber Bragg grating sensors.

The invention is based on the object to provide an improved measuring arrangement for determining fiber Bragg grating strain measurement signals, which measuring arrangement has a simple structure and is therefore cost-effective. Furthermore, the measuring arrangement should be stable over the long time.

SUMMARY OF THE INVENTION

This object is achieved with a measuring arrangement (interrogator) for fiber Bragg grating measuring points, including a broadband light source configured to emit light pulses, a first beam splitter with connections, a second beam splitter with connections, a third beam splitter with connections, a fourth beam splitter with connections, a fifth beam splitter with connections, photo diodes, and an optical delay element with connections, wherein the broadband light source is connected to a first connection of the first beam splitter via an optical fiber, a second connection of the first beam splitter is connected to a first connection of the second beam splitter via an optical fiber, a third connection of the first beam splitter is connected to the photodiode via an optical fiber, a second connection of the second beam splitter is connected to a first connection of the optical delay element via an optical fiber, a third connection of the second beam splitter is connected to a first connection of the fourth beam splitter via an optical fiber, a second connection of the optical delay element is connected to a first connection of the third beam splitter via an optical fiber, a second connection of the third beam splitter is connected to a first connection of the fifth beam splitter via an optical fiber, a second connection of the fourth beam splitter is connected to a second connection of the fifth beam splitter via an optical fiber, a third connection of the fifth beam splitter is connected to the photodiode via an optical fiber, a fourth connection of the fifth beam splitter is connected to the photodiode via an optical fiber, and wherein an FBG sensor which can be subjected to pressure or tension is connectable to a third connection of the third beam splitter, and an FBG sensor which can be subjected to tension or pressure is connectable to a third connection of the fourth beam splitter.

According to a refinement of the invention, at least one second circuit arrangement can be connected in parallel with the first circuit arrangement and all circuit arrangements are operated with the light source and the photodiode.

The invention has the advantage that it can be constructed very easily from standard optical elements. The special condition that the measuring arrangement requires a positive strain signal and a negative strain signal (tension/pressure) is not an immediate disadvantage in many strain measurements, because e.g. this condition is present in shear force measurements.

BRIEF DESCRIPTION OF THE DRAWING

The invention will be explained in greater detail with reference to an exemplary embodiment which is illustrated in the drawings.

DETAILED DESCRIPTION OF PREFERRED EMBODIMENTS

Figure 1:
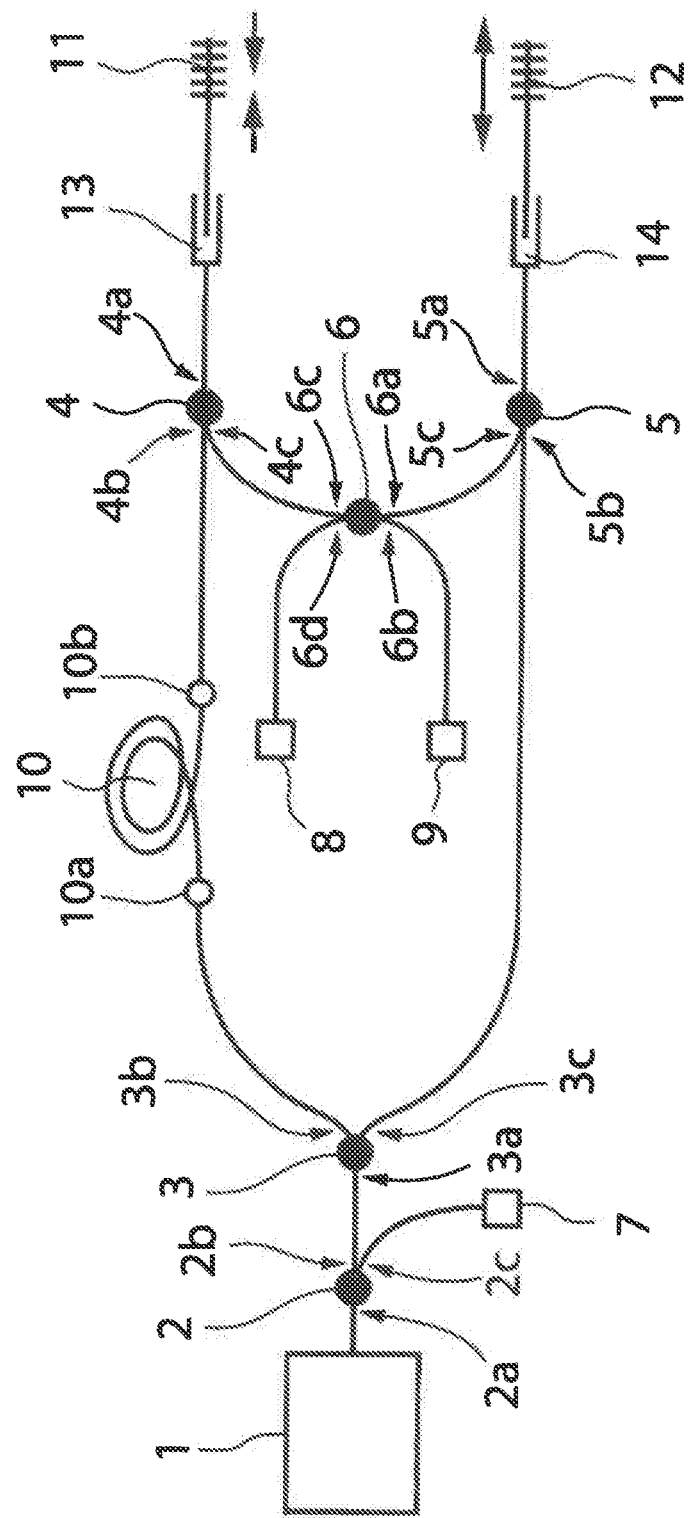
FIG. 1 shows the interrogator according to the invention for two fiber Bragg gratings measuring points.

The reference symbols in these figures designate the following elements:
1—broadband light source
2—first beam splitter with connections (2a, 2b, 2c)
3—second beam splitter with connections (3a, 3b, 3c)
4—third beam splitter with connections (4a, 4b, 4c)
5—fourth beam splitter with connections (5a, 5b, 5c)
6—fifth beam splitter with connections (6a, 6b, 6c, 6d)
7—photodiode
8—photodiode
9—photodiode
10—optical delay element with connections (10a, 10b)
11—FBG sensor
12—FBG sensor
13—optical coupling
14—optical coupling FIG. 1 shows the interrogator according to the invention for two fiber Bragg grating measuring points. The pulsed light from the broadband light source 1 is routed into the first beam splitter 2 via an optical fiber. The light is split there and a first light component is fed to the photodiode 7, which detects and monitors the light output of the light source 1. The artisan knows the circuits used for this purpose, so that their illustration and explanation can be omitted. The second light portion is conducted to the beam splitter 3. This beam splitter 3 splits the light again into two parts. The first light portion thereof is fed to the optical delay element 10. For this purpose, a fiber-optic coil is preferably used. After passing through the optical delay element 10, the light strikes the beam splitter 4. The light is passed from the beam splitter 4 to the FBG sensor 11 which is connected via an optical coupling 13 and is exposed to compression in this example, as indicated by the two force arrows directed towards each other. The FBG sensor 11 reflects part of the incident light back into the beam splitter 4, with the beam splitter 4 being designed such as to conduct this light portion into the beam splitter 6. The beam splitter 6 is designed such as to conduct this light portion into the photodiode 9.

The second light portion transmitted by the beam splitter 3 is conducted to the beam splitter 5. The light is passed from the beam splitter 5 to the FBG sensor 12 which is connected via an optical coupling 14 and, according to the technical teaching, has to be subjected to a strain, as indicated by the force arrow pointing in two directions. The FBG sensor 12 reflects part of the incident light back into the beam splitter 5, with the beam splitter 5 being designed such as to conduct this light portion into the beam splitter 6. The beam splitter 6 is designed such as to conduct this light portion into the photodiode 8.

Figure 2:
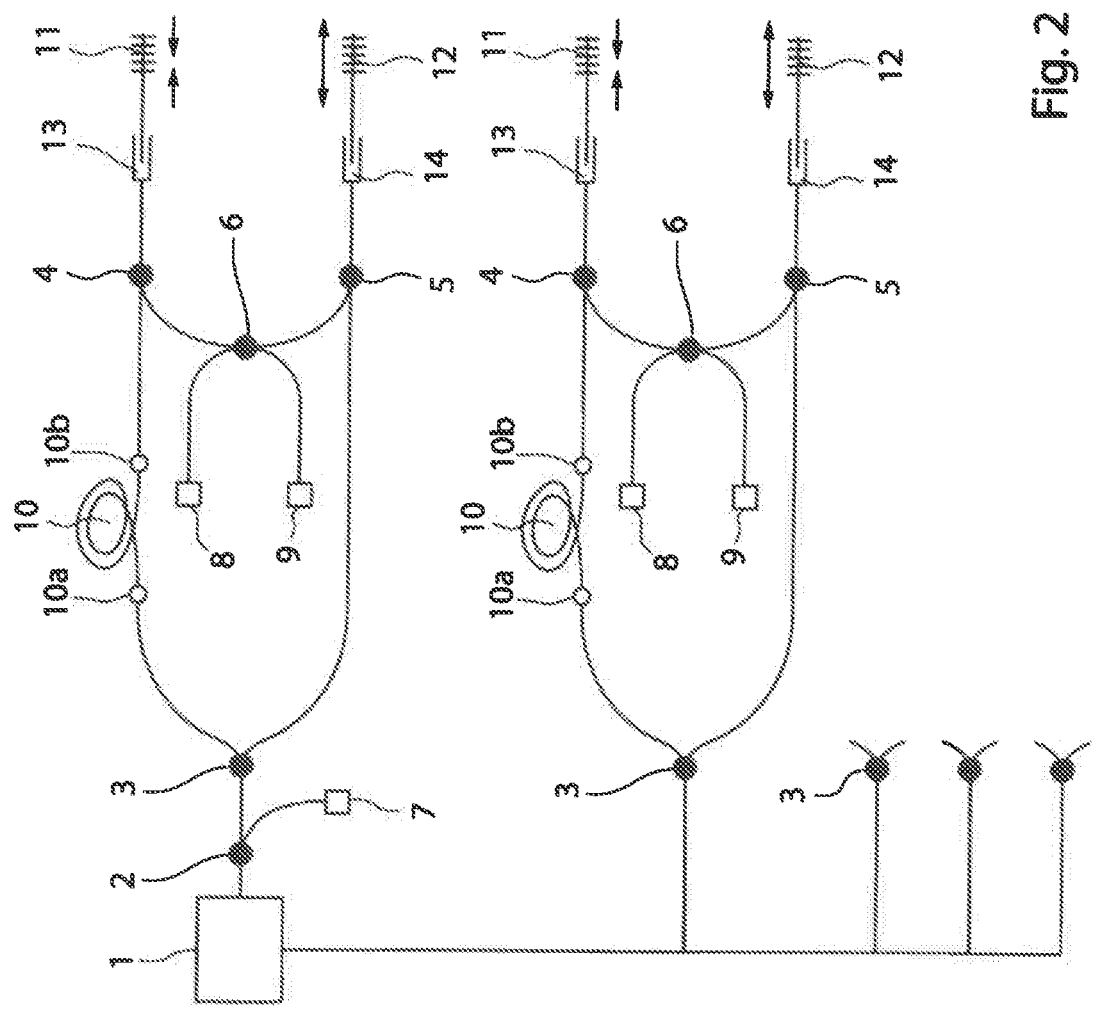
FIG. 2 shows the interrogator according to the invention for 4 and more even-numbered fiber Bragg grating measuring points.

FIG. 2 shows the interrogator according to the invention for 4 and more even-numbered fiber Bragg grating measuring points in a cascade arrangement. In a cascade arrangement, only a single broadband light source 1 and a single photodiode 7 are required for performance monitoring.

The invention claimed is:

1. A circuit arrangement for evaluating Fiber Bragg Grating (FBG) signals, said circuit arrangement comprising:
a plurality of photo diodes;
an optical delay element having first and second connections;
a plurality of beam splitters, with a first connection of a first one of the beam splitters connected to a first connection of a second one of the beam splitters via an optical fiber, with a second connection of the first one of the beam splitters connected to a first one of the photodiodes via an optical fiber, with a second connection of the second one of the beam splitters connected to the first connection of the optical delay element via an optical fiber, with the second connection of the optical delay element connected to a first connection of a third one of the beam splitters via an optical fiber, with a third connection of the second one of the beam splitters connected to a first connection of a fourth one of the beam splitters, with a second connection of the third one of the beam splitters connected to a first connection of a fifth one of the beam splitters via an optical fiber, with a second connection of the fourth one of the beam splitters connected to a second connection of the fifth one of the beam splitters via an optical fiber, with a third connection of the fifth one of the beam splitters connected to a second one of the photodiodes via an optical fiber, with a fourth connection of the fifth one of the beam splitters connected to a third one of the photodiodes via an optical fiber;
a broadband light source configured to emit light pulses and connected to a third connection of the first one of the beam splitters via an optical fiber;
a first FBG sensor subjected to pressure or tension and connectable to a third connection of the third one of the beam splitters; and
a second FBG sensor subjected to tension when the first FBG sensor is subjected to pressure and subjected to pressure when the first FBG sensor is subjected to tension, with the second FBG sensor connectable to a third connection of the fourth one of the beam splitters.

2. The circuit arrangement of claim 1 connected in parallel with at least one further circuit arrangement, the circuit arrangement and the further circuit arrangement being operated with the light source and the first one of the photodiodes.

\* \* \* \* \*

UNITED STATES PATENT AND TRADEMARK OFFICE
CERTIFICATE OF CORRECTION

| | | |
|---|---|---|
| PATENT NO. | : 11,506,548 B2 | Page 1 of 1 |
| APPLICATION NO. | : 16/954928 | |
| DATED | : November 22, 2022 | |
| INVENTOR(S) | : Luis Alberto De Almeida Ferreira, Francisco Manuel Moita Araujo and Jochen Maul | |

It is certified that error appears in the above-identified patent and that said Letters Patent is hereby corrected as shown below:

On the Title Page

Item [72] Inventors:
First Inventor's city of residence Luis Alberto De Almeida Ferreira
Replace "Vila Nova de Gala , (PT)" with --Vila Nova de Gaia , (PT)--.
Last name of second Inventor Francisco Manuel Moita Araujo
Replace "Moita Araljjo" with --Moita Araujo--.

Item [73] Assignee:
Replace "Hottingeer Brüel & Kjaer GmbH" with --HOTTINGER BRÜEL & KJAER GMBH--.

Signed and Sealed this
Seventh Day of March, 2023

Katherine Kelly Vidal
*Director of the United States Patent and Trademark Office*